Feb. 4, 1947. R. K. BONELL 2,415,080
ANTIHUNT ELECTRICAL CONTROL SYSTEM
Filed Sept. 3, 1942

INVENTOR
R. K. BONELL
BY Arthur H Serrell
his ATTORNEY

Patented Feb. 4, 1947

2,415,080

UNITED STATES PATENT OFFICE 2,415,080

ANTIHUNT ELECTRICAL CONTROL SYSTEM

Ralph K. Bonell, New York, N. Y., assignor to Sperry Gyroscope Company, Inc., Brooklyn, N. Y., a corporation of New York Application September 3, 1942, Serial No. 457,235

3 Claims. (Cl. 172—239)

This invention relates to remote control positioning apparatus such as is utilized, for instance, to cause a remote object, such as a searchlight or gun, to follow the angular direction of a pilot device, such as a telescope. Although, for the purpose of illustration, this invention is shown as applied to the remote positioning of a gun in relation to a telescope, the invention is applicable to all cases of follow-up where a directive signal is transmitted to a receiving device which controls the positioning of a heavy object in accordance therewith An object of the invention is the provision of means whereby the control system positioning the heavy object in accordance with the pilot device is so activated that hunt and surging are eliminated both during periods when the pilot device is in motion and when at rest.

A further object is the provision of means whereby the angular velocities of the pilot device and the controlled object may be differentially employed to secure a desired relationship between the positions of the pilot device and the controlled object.

Still another object of my invention is the provision of a synchronized control system in which a receiving device when operating at the same speed as a transmitting device is caused to assume an angular lead over the latter object which may be controllably selected. Thus, for instance, in fire control, the gun is caused to lead the sight by an amount determined by target speed, range and other factors. According to my invention, I may introduce such lead angle through the same mechanism formerly used solely for preventing hunting, by interposing an adjustable device in the mechanism for comparing the angular velocities of the controlling and controlled objects, whereby the relative effectiveness of said two velocities, as signal producing factors, is made adjustable. A net velocity signal is thus produced at the proper sign to require, for equilibrium, a positional signal corresponding to an angle of lead.

More particularly my invention constitutes an improvement in means for preventing speed lag and other errors in a positional control system for heavy objects, shown in copending application of Alger S. Riggs, entitled Apparatus for electric control, now Patent No. 2,408,813 dated October 8, 1946.

These and further objects of my invention will be evident from the drawing and specification forming a part hereof.

Figure 1:
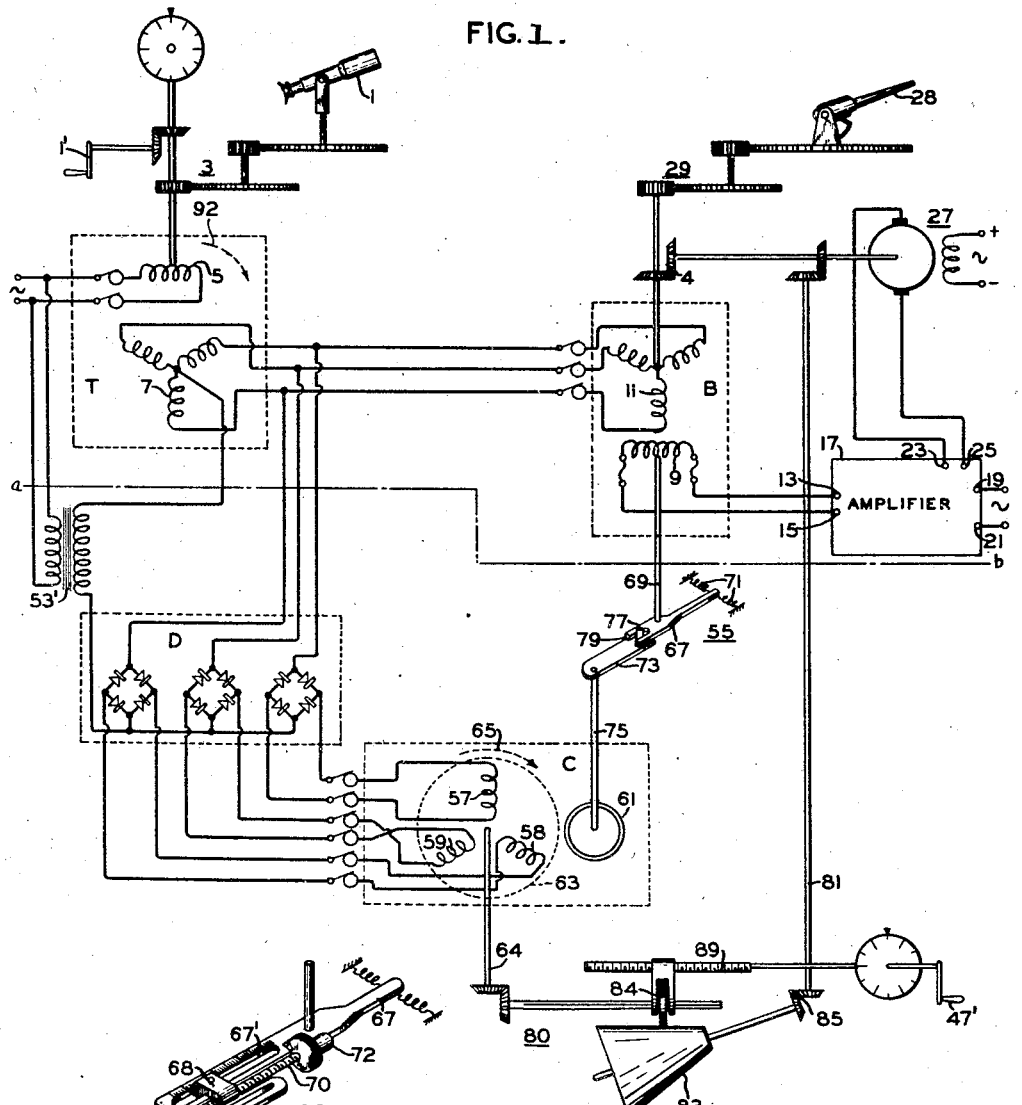
Fig. 1 is a diagram of a remote positioning control system embodying the present invention, and adapted to position a searchlight or gun in angular agreement with a telescope.

Referring to Fig. 1, the telescope 1 is angularly positioned by the hand crank 1' through a suitable gear train 3, and simultaneously the rotor 5 of the "selsyn" transmitter T is rotated with respect to its stator 7, thus displacing the stator flux of the receiver B, which may comprise a "selsyn" signal generator having a stator 9 and rotor 11. As a result of this displacement, a potential is induced across the winding 9 of the device B. This signal is impressed upon the input terminals 13 and 15 of the power amplifier 17 (having a source of power applied to terminals 19 and 21) which supplies a corresponding current from terminals 23 and 25 to the armature of the motor 27. In accordance with the above, said motor 27, through suitable gearing 4, rotates the rotor 11 of device B to the position in which zero or a minimum voltage is induced in winding 9. Simultaneously the gun 28 is moved through the gear train 29 to a position corresponding to the telescope. The operation of the above is so well known that a detailed description is not necessary here.

While the system so far described would ultimately position the gun in line with the sight, the response would be jerky and the condition known as hunting or surging would be present. In addition, there would be a lag in the following operation, which would vary roughly with the speed of turn of the sight. The circuit arrangements described herein provide a control free from the ill effects of surge and hunt and in addition not only permit of operating the gun in absolute agreement with the telescope but also permit of introducing any desired lead angle through the same mechanism employed for eliminating hunt.

To realize the above advantages, there is superimposed upon the displacement signal created in the winding of the rotor 11, a signal or combination of signals which is proportional to the difference in speed between the sending and receiving elements. As in the aforesaid Riggs patent the means for accomplishing this function is preferably located adjacent the gun 28, but instead of employing a pair of speed responsive generators as in the Riggs patent, one driven by the receiver and the other by the sending device for this purpose, I prefer to employ a differential torque producing device or meter C, together with an associated rectifier bank D, transformer 53', and a mechanical linkage and neutral positioning system shown schematically at 55.

Transformer 53' supplies an A. C. biasing voltage which causes the output of rectifier bank D to be sensitive to the phase of the voltages supplied by transmitter T. The output leads of transformer 53' and the leads from stator 7 of transmitter T are connected to rectifier bank D, from which pulsating direct current is transmitted to the three windings 57, 58 and 59 of the torque producing device C. Said windings 57, 58 and 59 are preferably rotatable (although for convenience they will be referred to as the "stator" windings, since they resemble such windings in an induction motor), the windings being shown as mounted on a field structure 63 mounted on shaft 64, driven directly or indirectly from the motor 27. Rotor 61 on shaft 75 is independently rotatable against resilient restraint and is subject to eddy current drag produced by relative motion of the stator field.

The torque producing meter C is preferably of the form shown in the patent to A. S. Riggs. No. 2,151,718, dated March 28, 1939, for Electrical control systems. As a result of the direct current supplied by the rectifier, a resultant rotating field of high magnitude is set up by stator windings 57, 58 and 59, which field (if such stator stood still) would rotate with and at the same speed as the transmitter T, and in the direction shown by the dotted arrow 65 when the transmitter rotates in the direction indicated by the arrow 92. If then, the stator is physically rotated in a direction opposite to the rotation of its field and at the same speed, no torque acts on the rotor 61 because the stator field is then stationary relative to the rotor. At any other speed of rotation of member 63 the torque on rotor 61 is proportional to the difference between such speed and the rotational speed of the stator field, which is that of the transmitter. This rotor is normally restrained to a neutral position by the lever 67 attached to its shaft 69 and centralizing springs 71. Lever 73 so links shaft 75 of the rotor 61 of device C and shaft 69 of the stator 9 of device B through the pin 77 attached to lever 73 and fork 79 in the end of lever 67, that a torque on the rotor 61 of device C causes a corresponding displacement of the stator 9 of device B from its neutral position. It will be understood that in "selsyn" devices the single and poly-circuit windings may, for most purposes, be interchangeably mounted on the stator or rotor.

Suppose, now, the motor 27 is blocked and the transmitter rotated through a few degrees in the direction of arrow 92. A current corresponding to this displacement is established through the amplifier 17 to drive the rotor 11 of device B in the direction of the arrow to cancel the displacement. Under this condition, if the motor is released, the rotor will be driven in the direction of the arrow. The flux due to direct current in the stator of device C will produce a torque or drag, because of its motion, on rotor 61, which, through the linkage system 55 will move the stator 9 in a direction to anticipate the position of zero induced voltage, so that the gun will be brought smoothly into alignment with the transmitter without overshooting. The effect of the rotation of the stator 63 of device C therefore is to produce a high degree of damping in the system.

If the transmitter is rotated continuously, in the direction of arrow 92, the flux in the stator of device C will rotate synchronously therewith, and the resulting torque on the rotor 61 is in the direction of the dotted arrow 65, so that the stator 9 of device B is moved in an opposite direction to that of the arrow. This is the case if the flux in stator 63 of torque producing device C rotates at transmitter velocity, whereas the coils of stator of C are rotated at less than the transmitter velocity (depending upon the chosen speed ratio between the stators of B and C as will be further described), and in the opposite direction. Thus, a control term dependent upon the velocity at which the system operates is introduced in the device B as an angular adjustment of stator 9, which permits operation of the system in absolute synchronism without lag, as with the arrangement of Fig. 1. The effect of decreasing the speed ratio between rotor 11 and stator 63 is equivalent to increasing the excitation of generator 31 in Fig. 1. The rotating field of stator 63 and the rotation of the stator itself may be considered as "signals" respectively derived from the transmitter and receiver speeds which are equivalent to the voltages in windings 35 and 35', respectively, of Fig. 1.

It will be evident that by further reducing the speed of rotation of the stator windings 57, 58 and 59 relative to that of rotor 11, a lead angle may be produced in the gun. For this purpose, I have shown a variable speed device 80 interposed between the motor driven shaft 81 and the stator shaft 64. As shown, this comprises a speed cone 83 driven through suitable gearing 85 from shaft 81, and a displaceable roller 84 driven from the cone, the position of which may be adjusted by turning the threaded shaft 89 from handle 47' in accordance with the lead angle scale S. It will be readily apparent, therefore, that any desired speed ratio may be obtained between the shafts 64 and 81 to give any desired angle of lag or lead.

Figure 2:
Fig. 2 is a modification of a part of Fig. 1.

Another means for producing the above effect is shown in Fig. 2. In place of the variable speed device 80, I have placed an adjusting device in the linkage system 55 of Fig. 1. In this case, pin 77 is made adjustable with respect to lever arms 67 and 73. Pin 77, instead of being rigidly fastened to link 67, is mounted on a block 68 slidably mounted in slot 67' and positioned by screw 70 journaled in bearings 72 and 74 on link 67. In this manner the length of the lever arms 67 and 73 may be inversely varied, thus producing a varied displacement between the rotor 61 of the torque device C and the rotor 9 of receiving device B. In the case of this modification, the telescope 1 and the gun 28 are connected to actuate the rotating field device at a fixed ratio which need not be unity.

Although I have shown and described my invention as applied to a follow-up remote positioning system as adapted to synchronously position a gun in accordance with a telescope, I do not desire to be limited thereto, inasmuch as the invention may be applied to other forms of control systems and arrangements within the scope of the appended claims.

Having described my invention, what I claim and desire to secure by Letters Patent is:

1. In a positional control system having a controlling object, a controlled object and means for driving the controlled object, a Selsyn transmitter and an electrically connected Selsyn signal generator, one Selsyn being driven by said controlling object and the other Selsyn being driven by the controlled object, a two-part torque motor electrically connected to said transmitter through rectifiers, means for rotating one element of said motor from said controlled object in a direction to produce a stationary field when the speed of the controlling object and that of the rotated part bear a predetermined relationship, means for introducing a correction in the signal generator actuated from said motor, and means for adjusting the speed of rotation of said torque motor element relative to the speed of said controlled object.

2. In a positional control system having a controlling object, a controlled object and a power motor for driving the controlled object, a Selsyn transmitter and an electrically connected Selsyn signal generator, one Selsyn being driven by said controlling object and the other Selsyn being driven by the controlled object, a two-part meter having rotatable field windings electrically connected between said Selsyns such that the field thereof electrically revolves at the speed of one of said objects, means for mechanically oppositely revolving said field at the speed of the other object, the armature of said meter being displaced through an angle proportional to the difference in such speeds, means for displacing a normally stationary element of one of said Selsyns from said armature, and an amplifier connected to said signal generator for driving said motor.

3. In a positional control system having a controlling object, a controlled object and a power motor for driving the controlled object, a Selsyn transmitter and an electrically connected Selsyn signal generator, one Selsyn being driven by said controlling object and the other Selsyn being driven by the controlled object, a two-part meter having rotatable field windings electrically connected to said transmitter, means for rotating said field from said controlled object in a direction to produce a stationary field when the speed of the controlling object and that of the rotated part bear a predetermined relationship, means for introducing a correction in the signal generator actuated from said meter, said first-named means being adjustable to vary the relationship between the movements of said power motor and the correction imparted to said signal generator to adjust the lag or lead of the control with respect to the controlling object, and an amplifier between said signal generator and said motor for driving the same.

RALPH K. BONELL.

REFERENCES CITED

The following references are of record in the file of this patent:

UNITED STATES PATENTS

| Number | Name | Date |
|---|---|---|
| 2,151,718 | Riggs | Mar. 28, 1939 |
| 2,172,410 | Riggs | Sept. 12, 1939 |
| 2,176,102 | Riggs | Oct. 17, 1939 |

FOREIGN PATENTS

| Number | Country | Date |
|---|---|---|
| 489,271 | British | July 22, 1938 |